Figure 3:
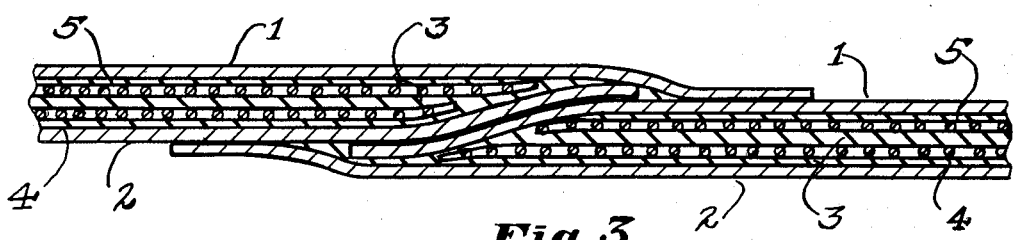

Jan. 2, 1934.  W. R. COLLINGS ET AL  1,942,354
ARTICLE OF MANUFACTURE
Filed Dec. 11, 1930  2 Sheets-Sheet 1
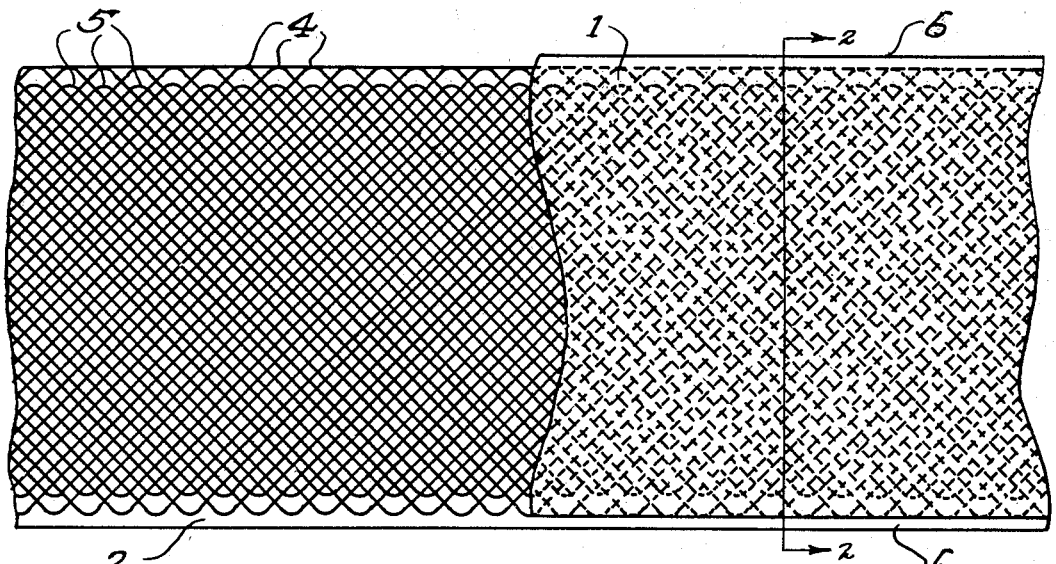
Fig.1.
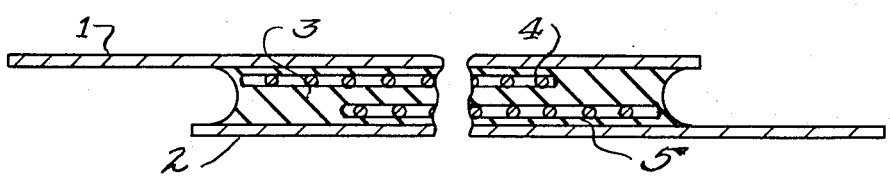
INVENTORS
WILLIAM R. COLLINGS
BY DONALD L. GIBB.
Thomas Griswold, Jr.
ATTORNEY Patented Jan. 2, 1934

1,942,354

UNITED STATES PATENT OFFICE 1,942,354

ARTICLE OF MANUFACTURE

William R. Collings and Donald L. Gibb, Midland, Mich., assignors to The Dow Chemical Company, Midland, Mich., a corporation of Michigan Application December 11, 1930
Serial No. 501,611

8 Claims. (Cl. 154—52)

The present invention is concerned with the production of a reinforced composite sheet which may be used for diverse purposes. Where such composite sheet is used for making bags or like containers it must have the requisite strength to withstand rough handling, especially where the container is large and the packaged commodity a relatively heavy one. This strength requirement can be met by suitably reinforcing the composite sheet. Reinforced composite sheets formed from two sheets of smooth paper of the same width placed edge to edge one over the other and having therebetween a series of diagonally laid reinforcing threads brought out to a single substantially uniform margin at each edge thereof are well known. The use of that type of reinforced sheet in the production of tubed articles such as containers or bags, however, presents the difficulty of having a relatively thick, stiff, and unwieldy single lap seam lengthwise of the tube. The seam is further limited in strength to the tearing, splitting, or cleavage resistance strength of a single sheet of paper. We have discovered on the other hand that where two sheets of paper of substantially the same width are adhesively stuck together in over-lapping or offset manner, such composite sheet can be tubed with a joint that is assembled in step-back formation which results in a relatively smooth and improved seam. Such seam in addition to fastening the two edges of the composite sheet together as in the single lap joint has the advantage of having both the inner and the outer sheet of the composite paper adhesively fastened together in forming the tube. This overcomes the previous seam difficulties, since such a seam is relatively smooth and is not dependent upon the splitting or cleavage resistance strength of a single sheet of paper. Our improved offset type of composite sheet can be reinforced in suitable manner, preferably by means of a series of reinforcing strands laid diagonally in two plies one above the other, said reinforcing strands ending in two lines of return bends along each edge of the sheet in offset formation.

One object of the present invention accordingly is the provision of an improved composite sheet which may be used for making moisture proof containers, such as bags, which sheet may include a sufficiently heavy filling of waterproof adhesive to render same substantially impervious to moisture. Another object is to provide a pliable reinforced waterproof paper that is exceedingly strong and presents the advantage when tubed of forming an exceedingly strong and relatively smooth seam. Further objects and advantages will appear as the description proceeds.

To the accomplishment of the foregoing and related ends, the invention, then, consists in the method and product hereinafter fully described and particularly pointed out in the claims, the annexed drawings and the following description setting forth but several of the various ways in which the principle of the invention may be utilized.

In said annexed drawings:—

Figure 4:
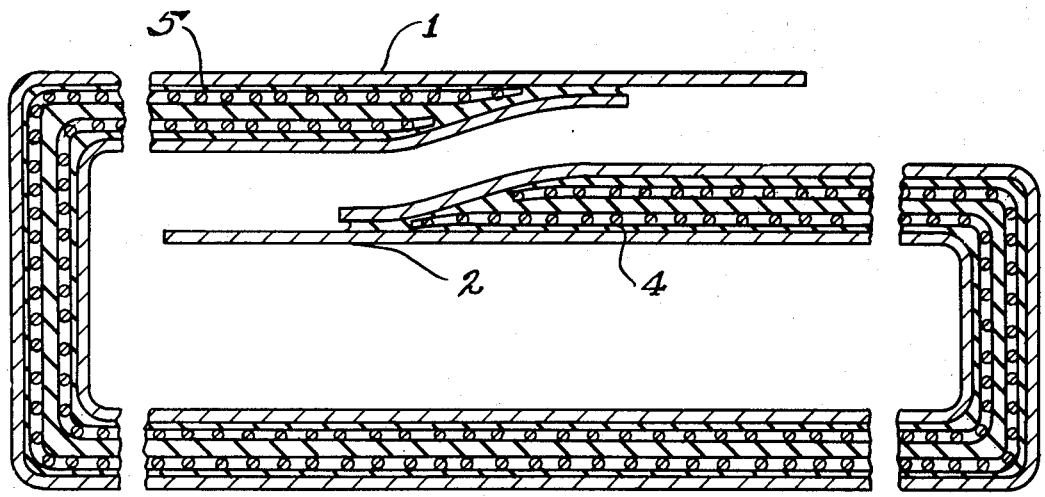
Figure 5:
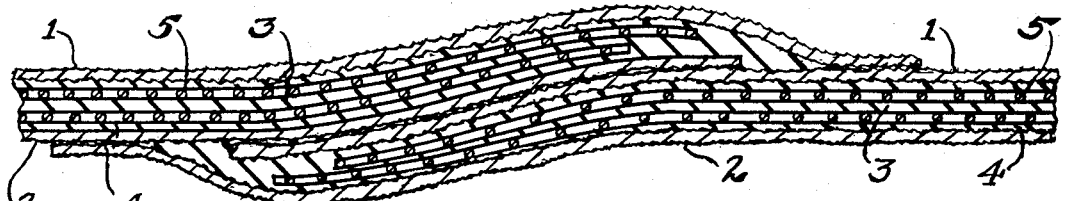

Fig. 1 is a view in partial section of one form of our present improved composite sheet. Fig. 2 is a section of Fig. 1 taken along line 2—2. Fig. 3 is a sectional assembly view of our improved seam. Fig. 4 is a sectional view of a tube or tubed article such as a bag with seam open ready for sealing. Fig. 5 shows a modified form of the seam shown in Fig. 3, using a composite sheet made from creped or crinkled paper.

The present invention deals with the formation of a composite reinforced sheet capable of being formed into a tube and thence into a container. Such sheet is characterized by having its component parts offset or over-lapping along the lateral edges. Such assemblage of the component parts permits the composite sheet to be tubed and the edges brought together in step-back or multi-lap formation, which produces a much smoother joint than the conventional single lap seam now in common use. Further, due to the use of the composite sheet having offset edges, an exceptionally good union can be made between the outer and inner faces thereof at the seam, which results in a stronger seam than would be possible with the aforementioned conventional single lap seam utilizing the same adhesive.

Referring more particularly to the drawings, Fig. 1 is an assembly view of a reinforced sheet constructed according to one phase of the present invention, a portion of top sheet 1 being broken away to show its relation to under sheet 2 as well as the arrangement of reinforcing threads or yarn strands 4 and 5 therebetween, the whole being held together by means of adhesive, the adhesive preferably being applied to the adjacent faces of the two sheets in an area corresponding roughly to the area covered by the reinforcing material. This leaves the over-lapping edges 6 on opposite sides of the sheet free from adhesive, which not only permits the composite sheet to be rolled up for handling or storage without having each turn on the roll stick to the adjacent one, but it also permits the use of any desired adhesive for sealing the seam during the tubing operation. The reinforcing threads or yarn strands 4 and 5 are preferably laid diagonally in two plies, one over the other in unwoven manner and at the same time in offset relation along the two edges of the sheet. In other words, the series of threads or yarn strands 4 are offset laterally relative to the series of threads or yarn strands 5, preferably in similar manner to the assemblage of sheets 1 and 2. Fig. 2, which is a section of Fig. 1 along line 2—2, brings this out. The reinforcing plies 4 and 5 are composed of threads or yarn strands or of reinforcing fabric superimposed one over the other in offset relation at the edges of the sheet.

The reinforcing material to be used may be made of cotton, jute, hemp, sisal, New Zealand, or equivalent material, preferably in the form of threads or spun strands of yarn. The composite sheet of Figs. 1 and 2 is shown in Fig. 4 formed into tube shape ready for sealing the seam thereof. Fig. 4 shows that the composite sheet as delivered for tubing has its edges assembled in offset relation in suitable manner for sealing together to form an exceptionally smooth and strong joint. Fig. 3 is a section of the joint after it has been coated with a suitable adhesive and sealed during the tubing operation. It is to be noted (Fig. 3) that not only is the outer sheet 1 sealed to the inner sheet 2, but the outer sheet is sealed to itself and the inner sheet is sealed to itself, all of which goes to make the seam considerably stronger than would be the case if the strength of the seam was entirely dependent upon sealing the outer sheet to the inner one at the seam as in a single lap seam. Fig 5 shows a similar, but more widely over-lapping, seam formed from a composite sheet made of creped paper.

The composite sheet as noted above is adhesively assembled with any adhesive suitable for the purpose at hand such as animal or vegetable glue or paste, asphalt, pitch, etc. Under ordinary conditions where handling products which are not spoilable by contact with water or moisture laden air the adhesive may be of a non-waterproof type. However, if the product is one subject to spoilage by moisture, such as calcium chloride, magnesium chloride, lime sulphur, cement, and the like, the adhesive should be preferably waterproof, pitch or flexible plying asphalt being satisfactory waterproofing materials for this purpose. While any paper suitable for making containers may be used according to the present invention, we prefer to use a creped paper which permits a container made therefrom to flex and give to a certain extent without tearing, even when handled in relatively rough manner.

The term "strength" used in the foregoing description to indicate the quality of our improved composite sheet designates the property of resistance to tearing or rupture possessed by the sheet. As an example of the improved strength, a bag made from a kraft paper having a longitudinal tensile strength of 90 pounds per inch width, when filled with 100 pounds of flake calcium chloride, will seldom withstand more than one or two drops of five feet to a concrete floor. On the other hand, a bag made from our improved composite paper formed, for instance, from two 55 pound 10 to 20 per cent stretch creped kraft paper sheets adhesively fastened together with waterproof flexible plying asphalt having embedded therein two plies of 12 pound jute reinforcing cords spaced at approximately ⅜ inch centers laid diagonally in diamond pattern will normally withstand 15 to 25, or more, five-foot drops to a concrete floor, although the tensile strength of the composite paper sheet is but approximately 60 pounds per inch width.

Other modes of applying the principle of our invention may be employed instead of the one explained, change being made as regards the product and method herein disclosed, provided the components or steps stated by any of the following claims of the equivalent of such stated components or steps be employed.

We therefore particularly point out and distinctly claim as our invention:—

1. As a new article of manufacture, a composite reinforced sheet suitable for diverse uses such as the formation of bags, such sheet including an intermediate unwoven fibrous layer consisting of a multiplicity of strands of spun yarn laid diagonally in two offset series crossing each other, said layer being embedded in adhesive; a protective layer adherent to one side of said intermediate layer, and a second protective layer adherent to the other side of said intermediate layer in offset relation to the other components of the composite sheet.

2. As a new article of manufacture, a waterproof composite reinforced sheet suitable for diverse uses such as the formation of bags, such sheet being composed of an intermediate unwoven fibrous layer consisting of a plurality of strands of spun yarn laid diagonally in multiple offset plies crossing each other, said layer being embedded in pitch, a protective layer adherent to one side of said intermediate layer, and a second protective layer adherent to the other side of said intermediate layer and offset in the same direction as the other components of the composite sheet.

3. As a new article of manufacture, a waterproof composite reinforced sheet suitable for diverse uses such as the formation of bags, such sheet being composed of an intermediate unwoven fibrous layer consisting of a multiplicity of strands of spun yarn laid diagonally in two offset series crossing each other, said layer being embedded in pitch, a layer of paper adherent to one side of said intermediate layer, and a second layer of paper adherent to the other side of said intermediate layer and offset in the same direction as the other components of the composite sheet.

4. A reinforced composite paper comprising two sheets of paper of substantially equal width, said sheets being offset laterally with respect to each other to form an overlapping margin of single sheet thickness along opposite edges of the assembled composite paper, a layer of adhesive uniting the overlying portions of said sheets, and two plies of fibrous reinforcing material in said adhesive layer, each ply being offset relatively to the other ply in the same direction as the adjacent paper sheet to leave a margin of single ply reinforcement along opposite sides of the adhesively united portions of the paper.

5. A reinforced composite paper comprising two sheets of paper of substantially equal width, said sheets being offset laterally with respect to each other to form an overlapping margin of single sheet thickness along opposite edges of the assembled composite paper, a layer of adhesive uniting the overlying portions of said sheets, and reinforcing material in said adhesive layer consisting of diagonally laid fibrous strands in two plies crossing each other, each ply being offset relatively to the other ply in the same direction as the adjacent paper sheet to leave a margin of single ply reinforcement along opposite sides of the adhesively united portions of the paper.

6. A reinforced composite paper comprising two sheets of paper of substantially equal width, said sheets being offset laterally with respect to each other to form an overlapping margin of single sheet thickness along opposite edges of the assembled composite paper, a layer of adhesive uniting the overlying portions of said sheets, and reinforcing material in said adhesive layer consisting of diagonal strands of spun yarn in two plies laid crosswise of each other, each ply being offset relatively to the other ply in the same direction as the adjacent paper sheet to leave a margin of single ply reinforcement along opposite sides of the adhesively united portions of the paper.

7. A reinforced composite paper comprising two sheets of creped paper of substantially equal width, said sheets being offset laterally with respect to each other to form an overlapping margin of single sheet thickness on opposite edges of the assembled composite paper, a layer of pliable cementing material uniting the overlying portions of said sheets, and reinforcing material in said cement layer consisting of diagonally laid strands of spun yarn in two plies crossing each other in diamond pattern, each ply being offset relatively to the other ply in the same direction as the adjacent paper sheet to leave a margin of single ply reinforcement along opposite sides of the cemented portions of the paper.

8. A reinforced composite paper comprising two sheets of creped paper of substantially equal width, said sheets being offset laterally with respect to each other to form an overlapping margin of single sheet thickness on opposite edges of the assembled composite paper, a layer of flexible plying asphalt uniting the overlying portions of said sheets, and reinforcing material in said cement layer consisting of diagonally laid strands of spun yarn in two plies crossing each other in diamond pattern, each ply being offset relatively to the other ply in the same direction as the adjacent paper sheet to leave a margin of single ply reinforcement along opposite sides of the cemented portions of the paper.

WILLIAM R. COLLINGS.
DONALD L. GIBB.